Feb. 2, 1965    J. P. BRUNEAU    3,168,410
PRASEODYMIUM-CERIUM YELLOW
Filed Jan. 17, 1962
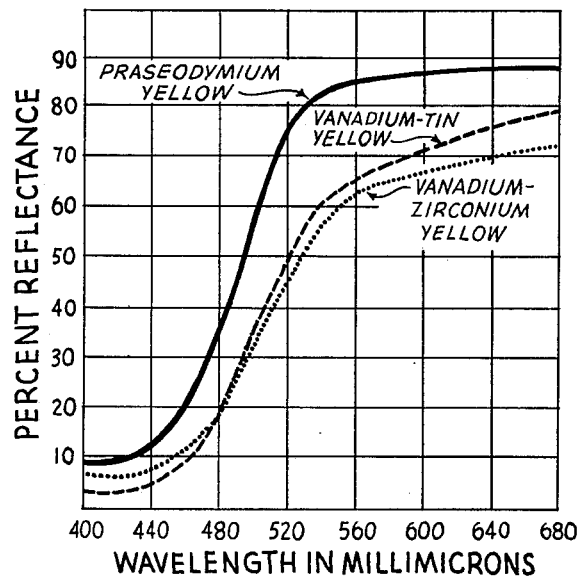
FIG. I
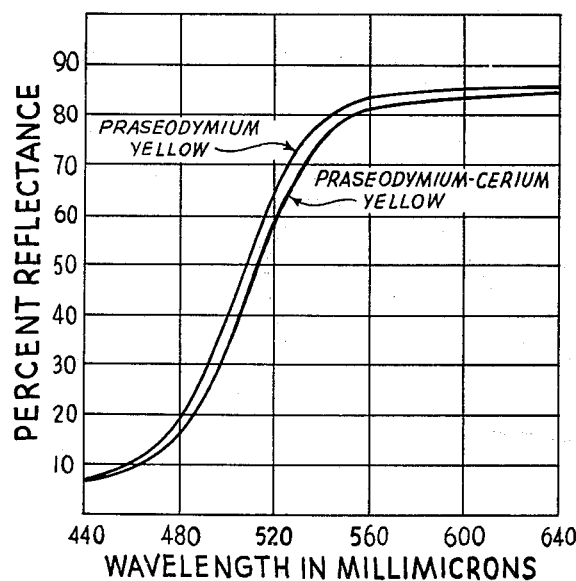
FIG. II
JEAN-PIERRE BRUNEAU, INVENTOR.
BY
Robert J. Blanke Atty.

3,168,410
PRASEODYMIUM-CERIUM YELLOW
Jean P. Bruneau, Limoges, France, assignor to The Harshaw Chemical Company, Cleveland, Ohio, a corporation of Ohio
Filed Jan. 17, 1962, Ser. No. 166,785
8 Claims. (Cl. 106—299)

This invention relates to ceramic pigments and more particularly to an improved class of praseodymium yellow ceramic pigments.

Various yellow pigments of the ceramic type are known to the art, such as cadmium yellows, uranium yellows, vanadium-tin yellows, and vanadium-zirconium yellows. Cadmium yellows and uranium yellows are presently employed only in limited amounts in the field of ceramic pigments. The limited usage of these pigments is due to the fact that cadmium yellows will fire out at very low temperatures, and uranium yellows are weak and their use is restricted. Vanadium-tin yellows and vanadium-zirconium yellows, while extensively employed as ceramic pigments, have an undesirable brownish tone. It has recently been found that certain compositions containing praseodymium when combined with certain color fixing agents would produce yellow ceramic pigments not having a brownish tone.

The praseodymium compositions of the prior art commonly employ calcination mixtures consisting of color fixing agents, mineralizer compositions and compounds capable of producing praseodymium oxide. Calcination mixtures of this type have been found to produce desirable yellow colors. The praseodymium calcination mixtures of the prior art, however, leave something to be desired in the effect of the fluctuations that occur in variations of conditions in calcination operations. A calcination mixture additive which would lessen this sensitivity to variations in calcination conditions would be a major improvement in that the resultant pigments would be more readily reproducible and would be of increased strength.

It is, therefore, an object of this invention to produce a praseodymium pigment having a yellow coloration which is more readily reproducible.

It is another object of this invention to produce a praseodymium pigment having a yellow coloration of increased strength which is more readily reproducible.

It is a further object of this invention to produce a praseodymium pigment having a yellow coloration with a pleasing orange tone.

I have now discovered that the addition of a compound capable of producing cerium oxide to a praseodymium, zirconium, silica calcination batch mixture will result in the formation of a yellow ceramic pigment of increased strength, which is readily reproducible. The resultant cerium containing yellow praseodymium pigment also has a pleasing orange tone.

The novel process of this invention is carried out by calcining an intimate mixture of compounds of zirconium capable of yielding zirconium oxide, compounds of praseodymium capable of yielding praseodymium oxide, compounds of cerium capable of yielding cerium oxide, compounds of silicon capable of yielding silicon oxide, and a source or sources of alkali metal ions, fluoride ions, and halide ions selected from the group consisting of chloride and bromide ions. The sources of the aforementioned ionic constituents may be referred to as mineralizer compositions. The calcination is carried out in a closed sagger which provides calcination substantially out of contact with air at a temperature range of from 800° C. to 1300° C., the optimum temperature range being from 860° C. to 1000° C. The praseodymium compound capable of yielding praseodymium oxide is present in the range of from 0.5% by weight to 10% by weight expressed as $Pr_6O_{11}$, and may be a compound such as, for instance, praseodymium chloride, praseodymium sulfate, praseodymium nitrate, praseodymium oxalate, praseodymium oxide, praseodymium fluoride, and praseodymium carbonate. The cerium compound capable of yielding cerium oxide is present in the range of from 0.25% by weight to 10% by weight expressed as $CeO_2$ and preferably from 1% to 5% by weight expressed as $CeO_2$, and may be a compound such as, for instance, cerium dioxide, cerous hydrate, cerous oxalate, ceric ammonium sulfate, cerous chloride and ceric ammonium nitrate. The silicon compound capable of yielding silicon oxide is present in the range of from 10% by weight to 55% by weight expressed as $SiO_2$ and may be silicon dioxide or silicic acid. The zirconium compound capable of yielding zirconium oxide is present in the range of from 35% by weight to 80% by weight expressed as $ZrO_2$ and may be a compound such as, for instance, zirconium oxide, zirconium hydroxide or zirconium carbonate. The expression "a compound capable of yielding a given oxide" includes that oxide itself. The word "compound" not preceded by an "a" is meant to include both the singular and the plural. The mineralizer or mineralizers consist of a source of alkali metal ions, fluoride ions, and halide ions other than fluoride ions, wherein the source of alkali metal ions may be a compound such as, for instance, sodium fluoride, sodium chloride, sodium bromide, lithium fluoride and potassium fluoride. The source of fluoride ions may be a fluoride compound such as, for instance, sodium fluoride, lithium fluoride, potassium fluoride, zirconium oxyfluoride, ammonium bifluoride, etc., and the source of halide ions may be a halide compound such as, for instance, ammonium chloride, sodium chloride, sodium bromide, zirconium oxychloride, zirconium tetrachloride and praseodymium chloride.

The mineralizer or mineralizers are preferably present in the praseodymium calcination batch mixture in amounts such that from 0.25% by weight to 8.0% by weight of alkali metal ions are present, 0.25% by weight to 3.0% by weight of fluoride ions are present, and 0.25% by weight to 8.0% by weight of halide ions other than fluoride ions are present. Improvements are obtained, however, by the presence of cerium compounds in the calcination batch mixture even though quantities of the mineralizer composition are outside the aforementioned range.

The following specific procedures are given for purposes of illustration of the invention and are not to be considered to limit the spirit or scope thereof:

*Example I*

| | Grams |
|---|---|
| Zirconium oxide | 63 |
| Silica | 31 |
| Praseodymium oxalate | 8 |
| Sodium fluoride | 3 |
| Ammonium chloride | 2 |
| Cerous hydrate | 1½ |

The above ingredients of the calcination batch mixture were hammer milled through a fine screen. The hammer milled mixture was then calcined in a covered sagger at about 900° C. The calcined mixture was again pulverized through a hammer mill and the resulting product was a strong yellow pigment.

Example II

| | Grams |
|---|---|
| Zirconium oxide | 63 |
| Silica | 31 |
| Praseodymium oxalate | 8 |
| Sodium fluoride | 3 |
| Ammonium chloride | 2 |
| Cerium dioxide | 2½ |

The above ingredients of the calcination batch mixture were hammer milled through a fine screen. The hammer milled mixture was then calcined in a covered sagger at about 900° C. The calcined mixture was again pulverized through a hammer mill and the resulting product was a strong yellow pigment.

While it is not known exactly what function cerium plays in producing the stronger and more reproducible yellow pigment, it is believed that the presence of cerium aids in the consistent fixation of the praseodymium coloring agent in the color fixing agent, possibly by making the calcination batch mixture less sensitive to variation in operating conditions. The ability of cerium to aid in praseodymium color fixation is quite unexpected in that other rare earth metals such as, for instance, lanthanum, neodymium, and samarium, fail to produce the desired increased color fixation when placed in a praseodymium calcination mixture. The presence of cerium in the final calcined pigment product also imparts a pleasing orange tone to the yellow pigment.

The advantages of the novel pigment of this invention will be more readily apparent from the description of the drawing which follows:

The drawing is a color comparison in a form of plotted curves. The curves were produced by a Hardy Recording Spectrophotometer from samples containing 8% pigment in a typical Cone 02 tile glaze placed on a ceramic tile body.

FIGURE 1 is a graphic representation of the color of three yellow ceramic tiles plotting percentages reflectance against wave-lengths in millimicrons. The solid line designates a praseodymium pigment. The broken line represents a vanadium-tin ceramic pigment, and the dotted line represents a vanadium-zirconium ceramic pigment. It should be noted that the solid line representing the praseodymium pigment exhibits a sharper breaking curve than either the vanadium-tin or vanadium-zirconium curves, a sharp breaking curve being indicative of a purer color.

FIGURE 2 is a graphic representation of the color of two praseodymium yellow pigments wherein percent reflectance is plotted against wave-length in millimicrons. The curve designated as praseodymium yellow represents a praseodymium yellow produced from calcination batches having no cerium. The curve designated as praseodymium-cerium yellow represents the new improved praseodymium yellow pigment of this invention.

The pigment compositions employed in FIGURE 2 were prepared as follows:

Praseodymium pigment

| | Grams |
|---|---|
| Zirconium oxide | 63 |
| Silica | 31 |
| Praseodymium oxalate | 11 |
| Sodium fluoride | 3 |
| Ammonium chloride | 4 |

The above ingredients were hammer milled through a fine screen. The hammer milled mixture was then calcined in a covered sagger at about 900° C. and again pulverized in a hammer mill.

Praseodymium-cerium pigment

| | Grams |
|---|---|
| Zirconium oxide | 63 |
| Silica | 31 |
| Praseodymium oxalate | 11 |
| Sodium fluoride | 3 |
| Ammonium chloride | 4 |
| Cerous oxalate | 5 |

The above ingredients were hammer milled through a fine screen. The hammer milled mixture was then calcined in a covered sagger at about 900° C. and again pulverized in a hammer mill.

As can be seen in the drawing, the curved designated as praseodymium-cerium yellow is the lower of the two curves and, therefore, the stronger. The curve designated as praseodymium-cerium yellow is also further to the right of the wave-length scale and is, therefore, a more desirable orange tone of yellow. The praseodymium-cerium yellow still exhibits the same sharp breaking curve which is indicative of a pure color.

The following table discloses the compositions which are representative of the cerium containing praseodymium pigments of this invention:

| | A | B | C | D | E | F | G |
|---|---|---|---|---|---|---|---|
| Zirconium Oxide | 63 | 63 | 63 | 63 | 63 | 63 | 63 |
| Silica | 31 | 31 | 31 | 31 | 31 | 31 | 31 |
| Praseodymium Oxalate | 10 | 10 | 10 | 10 | 10 | 8 | 11 |
| Sodium Fluoride | 3 | 3 | 3 | 3 | 3 | 3 | 3 |
| Sodium Chloride | 4 | | | 4 | | | |
| Ammonium Chloride | | 2 | 4 | | 4 | 2 | 4 |
| Cerous Hydrate | 3 | 3 | 4.5 | | | 1.5 | |
| Cerous Oxalate | | | | 5 | | | 5 |
| Cerium Dioxide | | | | | 2.5 | | |

Having thus disclosed my invention, what I claim is:

1. A yellow ceramic pigment being a calcination product consisting essentially of from 0.25% by weight to 10% by weight of oxide of cerium, from 0.5% to 10.0% by weight of oxide of praseodymium, from 10% by weight to 55% by weight of oxide of silicon, and from 35% by weight to 80% by weight of oxide of zirconium.

2. A yellow ceramic pigment being a calcination product consisting essentially of from 1% by weight to 5% by weight of oxide of cerium, from 0.5% by weight to 10% by weight of oxide of praseodymium, from 10% by weight to 55% by weight of oxide of silicon, and from 35% by weight to 80% by weight of oxide of zirconium.

3. The method of preparing a yellow ceramic pigment comprising calcining substantially out of contact with air in temperatures in the range of from 800° C. to about 1300° C. a mixture of 35% by weight to 80% by weight expressed as $ZrO_2$ of at least one zirconium compound capable of yielding zirconium oxide, from 10% by weight to 55% by weight, expressed as $SiO_2$, of at least one silicon compound capable of yielding silicon dioxide, from 0.5% by weight to 10.0% by weight, expressed as $Pr_6O_{11}$, of at least one praseodymium compound capable of yielding praseodymium oxide, from 0.25% by weight to 10% by weight, expressed as $CeO_2$, of at least one cerium compound capable of yielding cerium oxide, and a source of alkali metal ions present in proportion from 0.25 to 8.0% by weight, a source of fluoride ions present to the extent of from 0.25 to 3.0% by weight, and a source of halide ions from the class consisting of chloride and bromide ions present to the extent of from 0.25 to 8.0% by weight.

4. The method of claim 3 wherein said source of cerium capable of yielding cerium oxide is a cerium compound selected from the group consisting of cerium dioxide, cerous hydrate, cerous oxalate, cerous chloride, ceric ammonium sulfate, ceric ammonium nitrate, and mixtures thereof.

5. The method of claim 3 wherein said source of cerium capable of yielding cerium oxide is present in amounts of from 1% by weight to 5% by weight expressed as $CeO_2$.

6. As a new composition of matter a calcination batch mixture which is suitable for the preparation of yellow ceramic pigments by calcination consisting essentially of from 35% by weight to 80% by weight expressed as $ZrO_2$ of at least one zirconium compound capable of yielding zirconium oxide, from 10% by weight to 55% by weight expressed as $SiO_2$ of at least one silicon compound capable of yielding silicon dioxide, from 0.5% by weight to 10.0% by weight expressed as $Pr_6O_{11}$ of at least one compound capable of yielding praseodymium oxide, from 0.25% by weight to 10% by weight expressed as $CeO_2$ of at least one cerium compound capable of yielding cerium oxide and a source of alkali metal ions present to the extent of from 0.25 to 8.0% by weight, a source of fluoride ions present to the extent of from 0.25 to 3.0% by weight and a source of halide ions selected from the class consisting of chloride and bromide ions present to the extent of from 0.25 to 8.0% by weight.

7. The composition of claim 6 wherein said source of cerium capable of yielding cerium oxide is a cerium compound selected from the group consisting of cerium dioxide, cerous hydrate, cerous oxalate, cerous chloride, ceric ammonium sulfate, ceric ammonium nitrate, and mixtures thereof.

8. The composition of claim 6 wherein said source of cerium capable of yielding cerium oxide is present in amounts of from 1% by weight to 5% by weight expressed as $CeO_2$.

References Cited in the file of this patent

UNITED STATES PATENTS

| | | |
|---|---|---|
| 2,992,123 | Seabright | July 11, 1961 |
| 3,012,898 | Seabright | Dec. 12, 1961 |

FOREIGN PATENTS

| | | |
|---|---|---|
| 384,473 | Great Britain | Dec. 8, 1932 |